United States Patent

Okada et al.

[11] Patent Number: 6,080,228
[45] Date of Patent: Jun. 27, 2000

[54] GAS TRANSFER PIPE ARRANGEMENT

[75] Inventors: Tsuyoshi Okada, Yokosuka; Yasuo Suzuki, Chigasaki; Syoichi Yamada, Yokosuka; Kenji Tamura, Yokohama, all of Japan

[73] Assignee: JGC Corporation, Tokyo, Japan

[21] Appl. No.: 08/923,114

[22] Filed: Sep. 4, 1997

[30] Foreign Application Priority Data

Sep. 5, 1996 [JP] Japan ..................................... 8-255443
Jul. 18, 1997 [JP] Japan ..................................... 9-209817

[51] Int. Cl.⁷ .......................... B01D 35/02; B01D 39/12
[52] U.S. Cl. ................................ 96/189; 55/396; 55/410; 55/413; 55/418; 55/466
[58] Field of Search ............................. 96/188, 189, 355, 96/361, 362, 363, 364, FOR 147, FOR 155; 55/392, 396, 466, 495, 525, DIG. 17, 413, 394, 410, 418; 95/117, 231, 241, 273

[56] References Cited

U.S. PATENT DOCUMENTS

| 2,997,131 | 8/1961 | Fisher ....................................... 55/495 |
| 3,633,342 | 1/1972 | Richardson ............................... 55/396 |
| 3,997,303 | 12/1976 | Newton ..................................... 55/410 |
| 4,036,609 | 7/1977 | Pircon . |
| 4,047,910 | 9/1977 | Krockta . |
| 4,053,290 | 10/1977 | Chen et al. . |
| 4,120,670 | 10/1978 | Pircon . |

FOREIGN PATENT DOCUMENTS

| 23215/77 | 9/1978 | Australia . |
| 77050/81 | 9/1982 | Australia . |
| 873168 | 4/1979 | Belgium . |
| 1 794 340 | 3/1972 | Germany . |
| 25 13 991 A1 | 10/1976 | Germany . |
| 55-44362 | 3/1980 | Japan ............................. 96/FOR 155 |
| 1507428 | 9/1989 | Russian Federation ........ 96/FOR 155 |
| 827122 | 5/1981 | U.S.S.R. . |
| 1209261 | 2/1986 | U.S.S.R. . |
| 1360804 A1 | 12/1987 | U.S.S.R. . |
| 1430051 A1 | 10/1988 | U.S.S.R. . |
| 2 019 748 | 11/1979 | United Kingdom . |

OTHER PUBLICATIONS

Perry, John H., "Phase Separation", *Chemical Engineers's Handbook,* Fourth Edition, 1963, pp. 18–83—18–91.

Ludwig, Ernest E., "Mechanical Separations", *Applied Process Design for Chemical and Petrochemical Plants,* vol. 1, 2nd Edition, 1997, pp. 144–180.

*Primary Examiner*—David A. Simmons
*Assistant Examiner*—Robert A. Hopkins
*Attorney, Agent, or Firm*—McDermott, Will & Emery

[57] ABSTRACT

A gas transfer pipe arrangement includes a pipe in which gas containing droplets flows. A droplet separation unit is provided in the pipe for separating the droplets from the gas. A liquid collecting unit is annularly provided on the inner periphery of the pipe at a position downstream of the droplet separation unit for collecting a liquid from the droplets separated by the droplet separation unit. A liquid discharging mechanism is provided at a lower side of the pipe for discharging the liquid collected by the liquid collecting unit to the exterior of the pipe.

5 Claims, 11 Drawing Sheets

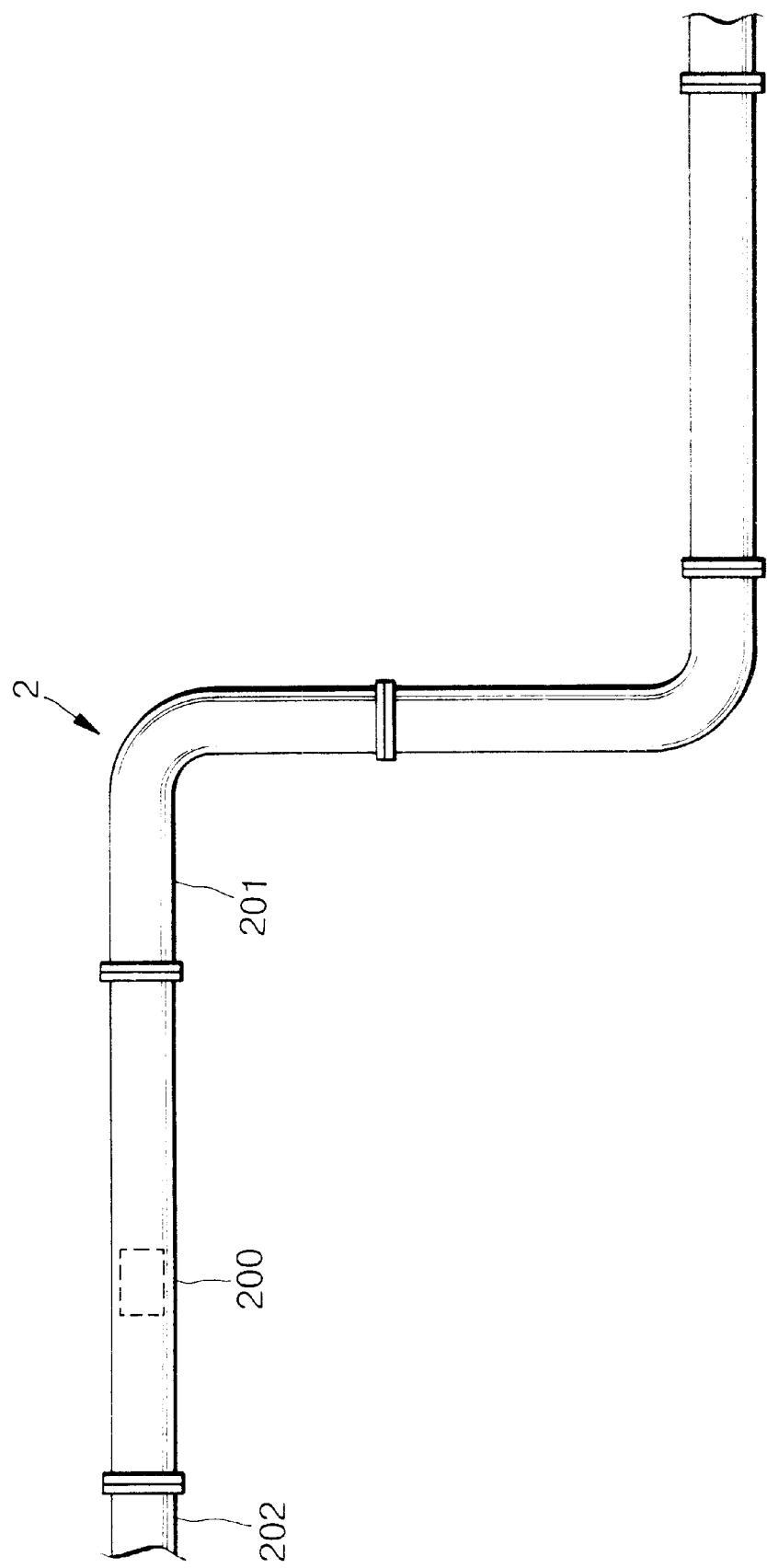

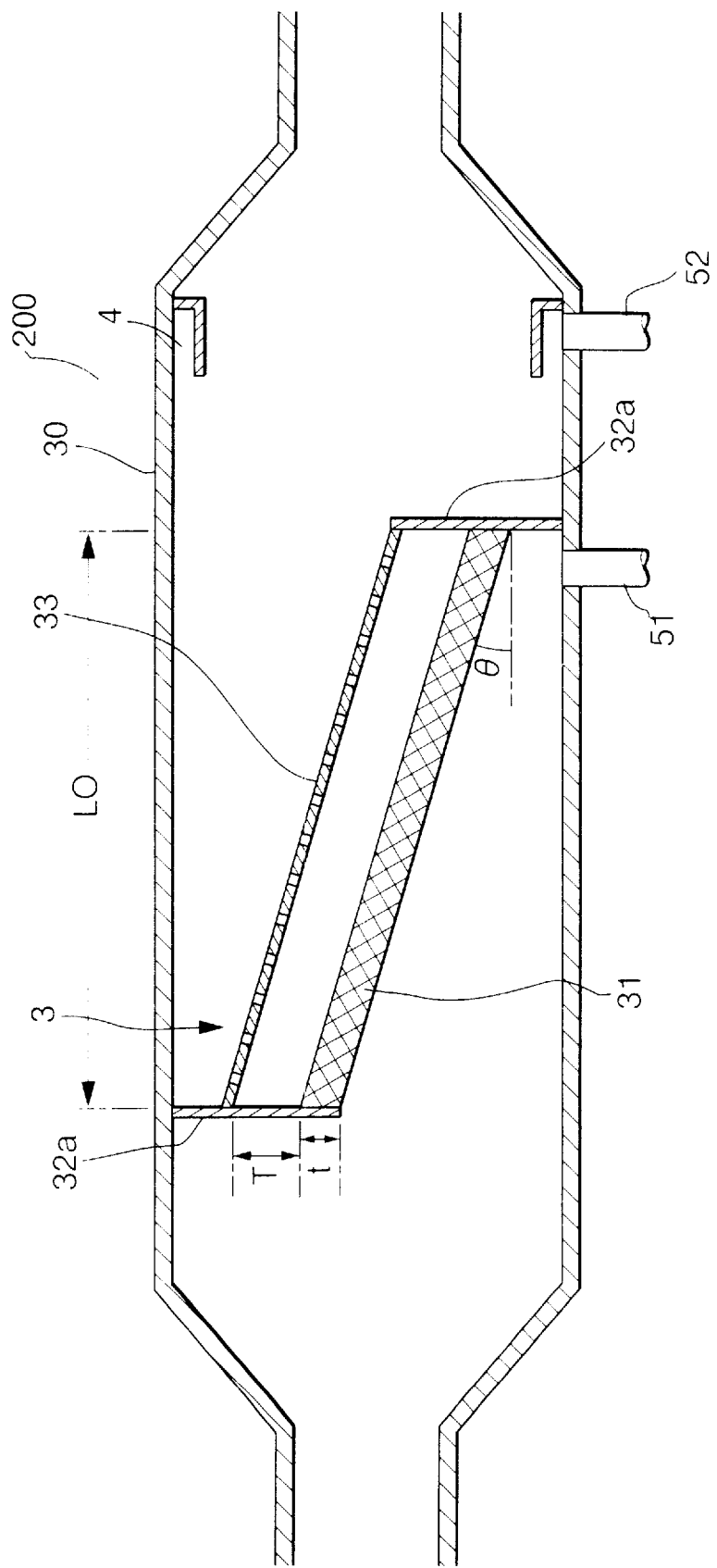

GAS TRANSFER PIPE ARRANGEMENT

BACKGROUND OF THE INVENTION

1. Field of the Invention

The present invention relates to a gas transfer pipe arrangement for transferring gas containing droplets of diameters no less than 8 μm at a velocity no less than 6 m/sec, which is employed, for example, in the chemical plant.

2. Description of the Prior Art

In many plants in petroleum refining industries, petrochemical industries and the like, droplets may be generated in the gas flow during processing. Upon transferring the gas flow containing the droplets, it may be necessary, depending on process steps carried out at a destination of the transferred gas, to remove the droplets from the gas flow. For example, at an inlet port of a compressor in the LNG or ethylene plant, it is required to remove no less than 99.9% of droplets having diameters of no less than 8 μm in view of the properties of gas. On the other hand, in a certain reaction system, it is necessary to suppress the amount of droplets contained in the gas flow as much as possible. For achieving this, a special installation, called a knockout drum, a compressor suction drum or the like, having a droplet separating function is provided between adjacent pipes so as to remove the droplets in the gas flow during transfer of the gas. Such a drum is independent of the pipes and detachably coupled to the adjacent pipes by fastening their flanges through bolts.

There have been available various types of droplet separators for such a use, for example, a gravity type in which droplets are separated through gravitational precipitation, a impingement type in which droplets are separated through impingement against a pad which, on the other hand, passes gas therethrough, an inertial force type in which droplets are separated through a difference in specific gravity between gas and droplets utilizing inertial forces, and a centrifugal force type in which droplets are separated through a difference in specific gravity between gas and droplets by applying a centrifugal force to droplets in the gas flow.

FIG. 13 shows an example of the impingement type. In this example, a mesh pad 12 is provided in a separator vessel 11 at an upper side thereof. In this droplet separator, gas containing droplets is introduced into the separator vessel 11 via a gas inlet port 13a provided substantially at the center of the side wall of the separator vessel 11 and flows upward toward a gas outlet port 13b provided at the top of the separator vessel 11 via the mesh pad 12. Upon passing the mesh pad 12, the droplets collide against the surfaces of the mesh pad 12 to gradually form liquid films which then drop due to the gravity to be separated from the gas flow and are then discharged via a liquid outlet port 14 provided at the bottom of the separator vessel 11.

FIG. 14 shows an example of the inertial force type. In this example, Impingement plates called vanes 16 each having, for example, a corrugated shape are arranged at regular intervals in a separator vessel 15. Each of the vanes 16 is disposed vertically and in parallel to a flow passage of gas. At upstream and downstream sides of a flow passage of the separator vessel 15, triangle pole-shaped flow passage members 18a and 18b are provided, respectively. A gas inlet port 17a and a gas outlet port 17b are arranged at an upstream end of the flow passage member 18a and at a downstream end of the flow passage member 18b, respectively. In this droplet separator, the gas containing droplets flows zigzag between the adjacent vanes 16. While flowing, inertial forces are applied to droplets having large specific gravities so that the droplets deviate from the flow line of the gas and collide against the surfaces of the vanes 16 to form liquid films so as to be separated from the gas flow. Then, the gas is discharged via the gas outlet port 17b, while the liquid is discharged via a liquid outlet port 19 provided at a lower side of the vanes 16.

In the foregoing droplet separator of any type, however, the gas velocity within the applicable range thereof is sometimes lower than the gas velocity in the pipe. Accordingly, for reliably achieving the removal of droplets, it is necessary to reduce the gas velocity so that the inner diameter of the separator vessel is required to be set significantly greater than that of the pipe. In the LNG or ethylene plant, since the inner diameter of the pipe is large, that is, some tens of centimeters to about 1m, the droplet separator is much increased in size corresponding to the large-diameter pipe.

Therefore, the cost of the droplet separator itself is increased, and a corresponding large space therefore is required, and further the piping becomes complicate, resulting in cost increase on the whole. Further, since the size increase of the droplet separator causes the size increase of a device for collecting the droplets separated by the droplet separator, a lot of labor and time are required for maintenance, check and recovery.

SUMMARY OF THE INVENTION

Therefore, it is an object of the present invention to provide a gas transfer pipe arrangement, wherein gas-liquid separation is performed in a gas transfer pipe to make the conventional droplet separator unnecessary so as to achieve reduction in size and cost of the whole plant.

The present invention has been made aiming at using a gas transfer pipe for not only transferring gas containing droplets, but also working as a droplet separator.

According to one aspect of the present invention, a gas transfer pipe arrangement comprises a pipe in which gas containing droplets of diameters no less than 8 μm flows at a velocity no less than 6 m/sec; a droplet separating mechanism provided in the pipe for separating the droplets from the gas; a liquid collecting mechanism provided in the pipe at a position downstream of the droplet separating mechanism for collecting a liquid from the droplets separated by the droplet separating mechanism; and a liquid discharging mechanism for discharging the liquid collected by the liquid collecting mechanism to the exterior of the pipe.

It may be arranged that the pipe is coupled to adjacent pipes through welding.

It may be arranged that the droplet separating mechanism comprises a plate-like inertial-impingement separation element for separating the droplets from the gas due to a difference in inertial force between the droplets and the gas, and that the inertial-impingement separation element is disposed in parallel to an axis of the pipe so that a velocity of the gas passing the inertial-impingement separation element becomes lower to be no greater than a maximum value of an applicable gas velocity range of the inertial-impingement separation element.

It may be arranged that the droplet separating mechanism comprises a plate-like inertial-impingement separation element for separating the droplets from the gas due to a difference in inertial force between the droplets and the gas, and that the inertial-impingement separation element is disposed slantly relative to an axis of the pipe so that a velocity of the gas passing the inertial-impingement separation element becomes lower to be no greater than a maximum value of an applicable gas velocity range of the inertial-impingement separation element.

It may be arranged that a portion of the pipe is greater in diameter than other portions thereof, and the inertial-impingement separation element is provided in the foregoing portion.

It may be arranged that the inertial-impingement separation element has gas-flow resistances which are set greater at a region thereof corresponding to a region at a front side thereof where a velocity of the gas is higher.

It may be arranged that the droplet separating mechanism further comprises a velocity adjusting member provided at at least one of a front side and a backside of the inertial-impingement separation element, and that the velocity adjusting member has hole area rates which are set smaller at a region thereof corresponding to a region at the foregoing front side where a velocity of the gas is higher.

It may be arranged that the velocity adjusting member comprises a perforated plate.

It may be arranged that a guide member is further provided at an upstream side of the inertial-impingement separation element in an axial direction of the pipe for guiding the flow of the gas containing the droplets.

It may be arranged that the droplets are composed of, as a main component, hydrocarbon with carbon atoms 4 to 8, and the gas is composed of, as a main component, hydrocarbon with carbon atoms 1 to 8.

BRIEF DESCRIPTION OF THE DRAWINGS

The present invention will be understood more fully from the detailed description given hereinbelow, taken in conjunction with the accompanying drawings.

In the drawings:

FIG. 1 is a diagram showing a gas transfer pipe unit including a pipe which is employed in a gas transfer pipe arrangement according to a first preferred embodiment of the present invention;

FIG. 7 is a longitudinal sectional view showing another modification of the first preferred embodiment of the present invention;

DESCRIPTION OF THE PREFERRED EMBODIMENT

Now, preferred embodiments of the present invention will be described hereinbelow.

The present invention deals with a gas transfer pipe arrangement for use in a chemical plant, such as a LNG or ethylene plant. Since the velocity within gas transfer pipes in the chemical plant is normally no less than 6 m/sec and droplets having diameters of no less than 8 $\mu$m are required to be removed in those pipes, the present invention deals with a case where the droplets having diameters no less than 8 $\mu$m are separated from the gas flowing at the velocity no less than 6 m/sec.

Now, the first preferred embodiment of the present invention will be described with reference to FIGS. 1 to 3.

FIG. 1 shows a pipe unit 2 for transferring gas containing droplets of diameters no less than 8 $\mu$m to a compressor at the velocity no less than 6 m/sec in, for example, the petroleum refining plant. The pipe unit 2 is made of metal and comprises large-diameter pipes each having an inner diameter D of, for example, 1 m and coupled to each other by welding. In the figure, numeral 200 denotes one of such pipes which is employed in a gas transfer pipe arrangement according to the first preferred embodiment of the present invention and welded to the adjacent pipes 201 and 202.

Figure 2A:
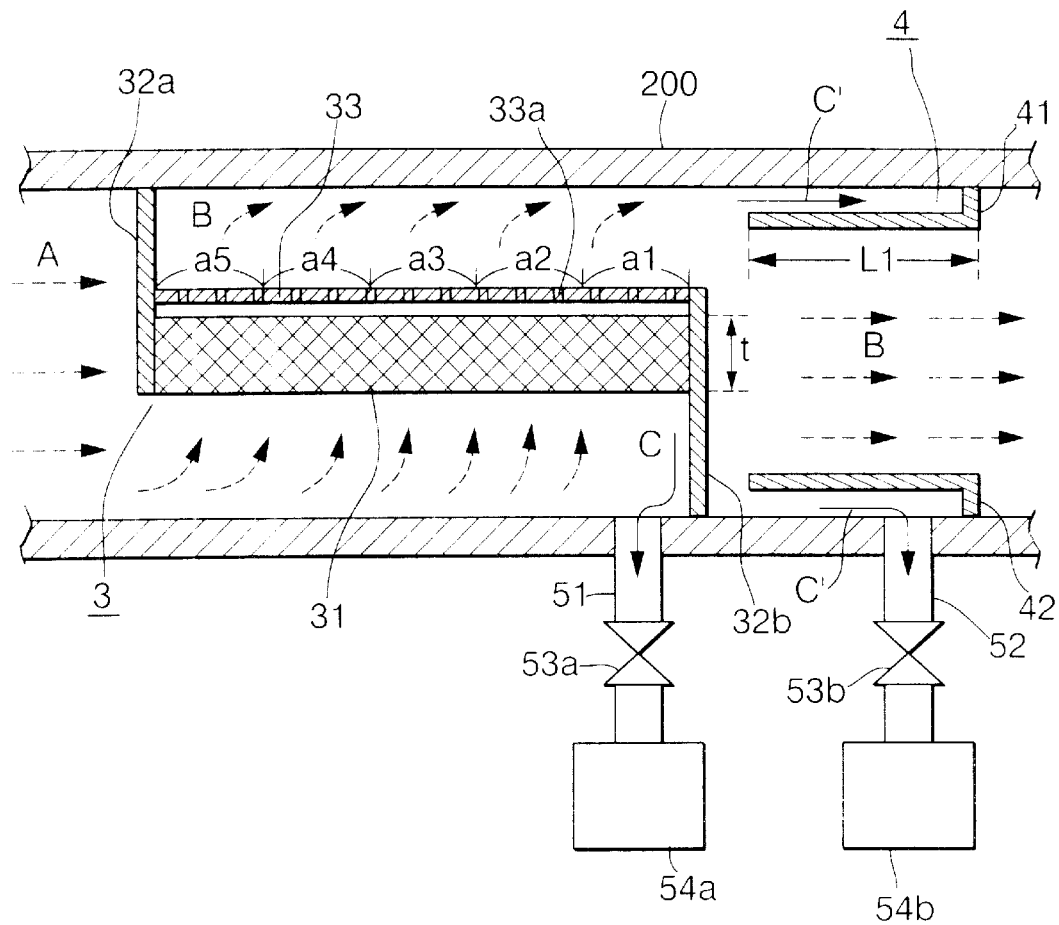
FIGS. 2A and 2B are a longitudinal sectional view and a cross-sectional view, respectively, showing the gas transfer pipe arrangement according to the first preferred embodiment of the present invention.
Figure 2B:
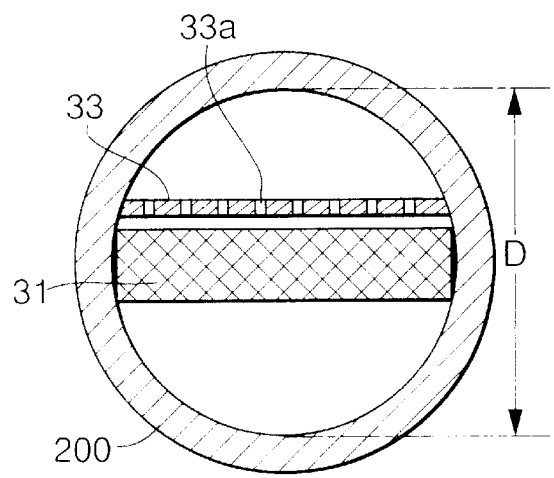

FIG. 2A is a longitudinal sectional view of a portion of the pipe 200 identified by a dotted line in FIG. 1. In the figure, numeral 3 denotes a droplet separation unit. The droplet separation unit 3 comprises a mesh pad 31 in the form of a plate working as an inertial-impingement separation element. The mesh pad 31 is made of wires having, for example, 0.120 mm in diameter and has the shape of a rectangular parallelepiped with a thickness t of 100 to 150 mm and the 98% porosity. The mesh pad 31 is disposed horizontally in the pipe 200 at the essentially vertical center thereof so as to divide the inside of the pipe 200 into upper and lower parts as seen from FIG. 2B.

At an upstream end of the mesh pad 31 is provided a semicircular (as seen along an axis of the pipe 200) plate-like support 32a extending upward. Similarly, at a downstream end of the mesh pad 31 is provided a semicircular plate-like support 32b extending downward. These supports 32a and 32b are welded to the inner periphery of the pipe 200 at upper and lower sides thereof, respectively. In the region defined by the supports 32a and 32b, a later-described flow passage for the gas flow is formed.

Just at the backside (downstream side) of the mesh pad 31, a perforated plate 33 formed with a number of holes 33a is provided so as to confront the whole upper surfaces of the mesh pad 31. The perforated plate 33 works as a velocity adjusting member (rectifying member) for adjusting the velocities of the gas passing the mesh pad 31 so as to be essentially uniform thereover. This gas velocity adjustment is achieved by, for example, setting the hole area rates of the perforated plate 33 (ratio of the total area of the holes 33a relative to an area of the perforated plate 33) to be smaller at a region thereof corresponding to a region at a front side (upstream side) of the mesh pad 31 where the gas velocity is higher.

Specifically, the velocity of the gas flowing into a front surface (upstream-side surface) of the mesh pad 31 becomes greater as advancing deeper into the pipe (as approaching the support 32b). Accordingly, for example, the perforated plate 33 is divided into five regions a1 to a5 along the axis of the pipe 200, and the hole area rates thereof are set to be gradually smaller in order of a5, a4, a3, a2 and a1.

Figure 3:
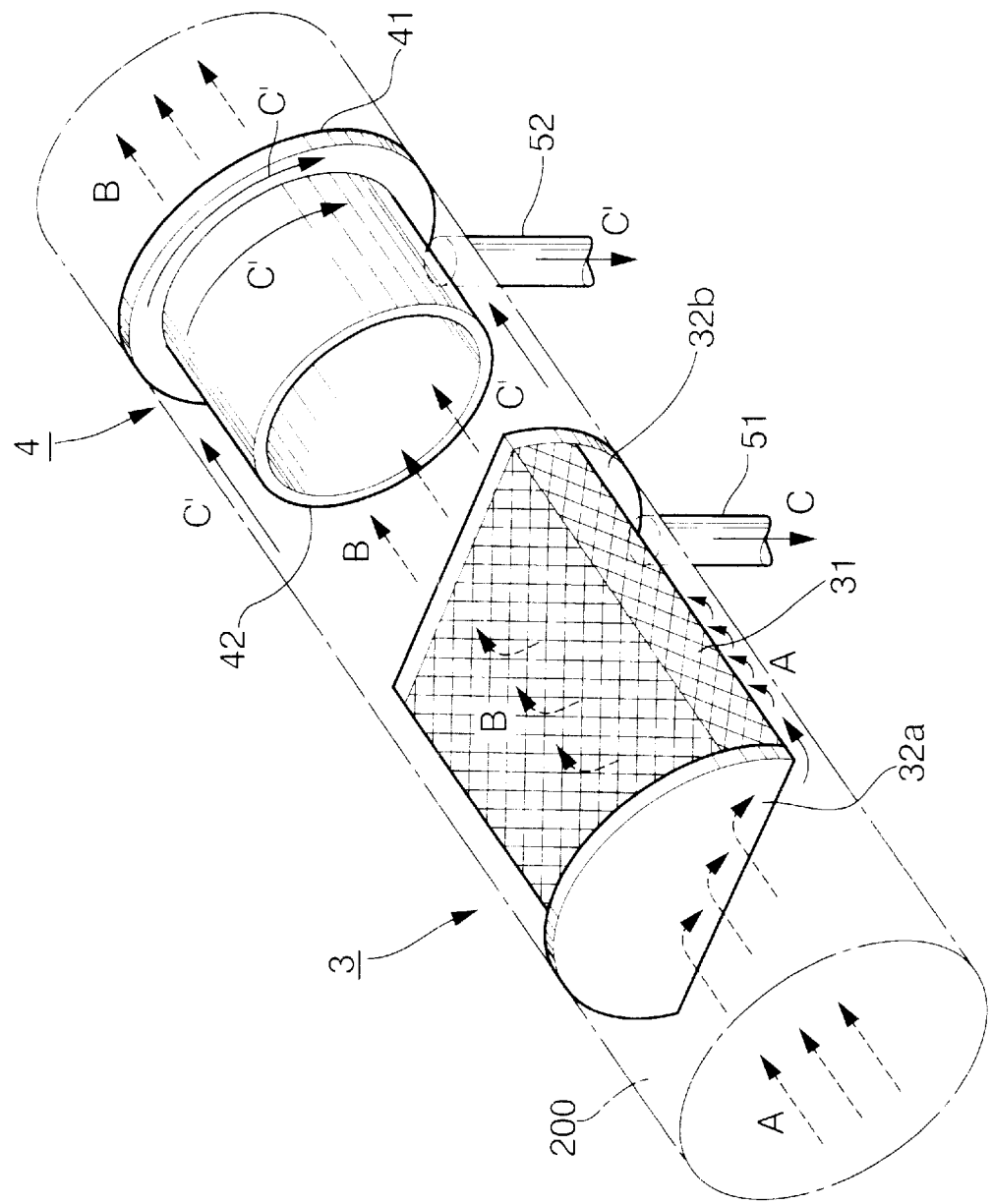
FIG. 3 is a perspective view showing a droplet separation unit and a liquid collecting unit employed in the gas transfer pipe arrangement according to the first preferred embodiment of the present invention.

As shown in FIGS. 2A and 3, downstream of the mesh pad 31 is provided a liquid collecting unit 4 formed annular along the inner periphery of the pipe 200. The liquid collecting unit 4 comprises an annular fixed portion 41 welded to the inner periphery of the pipe 200, and a tubular portion 42 extending upstream from the fixed portion 41 along the axis of the pipe 200. For example, a gap between the tubular portion 42 and the inner periphery of the pipe 200 is set to 10 to 20 mm, and a length L1 is set to about 200 mm.

Just upstream of the support plate 32b, a discharge pipe 51 is connected to the pipe 200 at a lower side thereof for discharging the liquid to the exterior of the pipe 200. Further, just upstream of the fixed portion 41 of the liquid collecting unit 4, a discharge pipe 52 is connected to the pipe 200 at a lower side thereof for discharging the liquid collected by the liquid collecting unit 4 to the exterior of the pipe 200. The other ends of the discharge pipes 51 and 52 are connected to traps 54a and 54b via valves 53a and 53b, respectively.

In the pipe 200, since the flow of the gas containing droplets is prevented by the support plates 32a and 32b, the gas containing droplets passes the mesh pad 31 and the perforated plate 33 from the lower side to the upper side thereof as shown by arrows A in FIGS. 2A and 3. As shown by arrows B in the figures, the gas component passes the mesh pad 31 in a direction perpendicular to the axis of the pipe 200 and then flows again along the axis of the pipe 200. On the other hand, due to a difference in inertial force between the droplets and the gas, the droplets can not pass the mesh pad 31 but collide against the lower surfaces of the mesh pad 31 to adhere thereto. Then, the adhering droplets gradually collect to be the greater droplets and drop downward as shown by an arrow C due to the gravity, and are discharged to the exterior of the pipe 200 via the discharge pipe 51 and collected into the trap 54a. In this fashion, the droplets are separated from the gas flow.

On the other hand, the droplets having passed the mesh pad 31 further advance due to the inertial force to collide against the inner periphery of the pipe 200, and then gradually collect to be the greater droplets which then flow downstream along the inner periphery of the pipe 200 as shown by arrows C'. Subsequently, as shown in FIG. 3, the droplets collide against the fixed portion 41 of the liquid collecting unit 4 and flow downward to be discharged to the exterior of the pipe 200 via the discharge pipe 52 and then collected into the trap 54b.

As described above, the droplets are prevented by the liquid collecting unit 4 from further flowing downstream and collected, while, as shown by arrows B, the gas passes the center opening of the liquid collecting unit 4 and flows further downstream. In this fashion, the droplets are separated from the gas flow.

As described above, when the mesh pad 31 is arranged in the pipe horizontally along the axis thereof, the gas passes the mesh pad 31 in a direction perpendicular to the axis of the pipe 200. Accordingly, a sectional area (passing area of the gas) of the mesh pad 31 can be set greater than that of the pipe 200 so as to reduce the velocity of the gas upon passing the mesh pad 31. For example, the mesh pad 31 is applicable to the gas velocity no greater than 3 m/sec. Hence, if the gas velocity in the pipe 200 is about 6 m/sec as described before, the applicable gas velocity range of the mesh pad 31 is exceeded. However, by arranging the mesh pad 31 horizontally along the axis of the pipe 200 to set the passing area of the gas to be twice the sectional area of the pipe 200, the gas velocity can be lowered to about 3 m/sec which is within the applicable gas velocity range of the mesh pad 31.

Further, the gas flow rates are adjusted to be essentially uniform by providing the perforated plate 33. Specifically, since the change in flow direction of the gas is rapid at the upstream side so that the gas is reluctant to flow in the direction perpendicular to the axis of the pipe 200, the flow rate of the gas passing the mesh pad 31 is small at the upstream side and gradually increases toward the downstream side. Since the gas velocity is proportional to the gas flow rate, the gas velocity is small at the upstream side and gradually increases toward the downstream side.

On the other hand, as described above, the hole area rates of the perforated plate 33 are set great at the upstream side while set to be gradually reduced toward the downstream side. Accordingly, considering a composite structure in combination of the mesh pad 31 and the perforated plate 33, the gas-flow resistance is small at the upstream side while gradually increasing toward the downstream side. As a result, the velocities of the gas passing the mesh pad 31 are adjusted to be essentially uniform thereover.

With this arrangement, It is possible to adjust the passing velocities of the gas to fall within the applicable range of the mesh pad 31 at all the gas passing regions thereof. By arranging the mesh pad 31 along the axis of the pipe 200, the velocity distribution is generated at the front side of the mesh pad 31. However, by equalizing the velocities of the gas passing the mesh pad 31, even if the applicable gas velocity range of the mesh pad 31 is small, the droplets and the gas can be reliably separated from each other.

In this embodiment, as described above, the mesh pad 31 is provided in the gas transfer pipe 200 horizontally along the axis thereof so as to set the passing area of the mesh pad 31 to be greater than the sectional area of the pipe 200. Thus, the gas passing velocities within the mesh pad 31 are lowered to fall within the applicable range of the mesh pad 31. Further, the perforated plate 33 is provided to equalize the gas passing velocities within the mesh pad 31. Hence, even if the gas velocity in the pipe 200 is high, for example, about 6 m/sec, the droplet separation can be reliably achieved by the mesh pad 31.

Although the perforated plate 33 may be provided at the front side (upstream side) of the mesh pad 31, it is preferable to provide the perforated plate 33 at the backside (downstream side) of the meshed plate 31 in the neighborhood thereof. The reason for this is as follows: When the perforated plate 33 is provided at the front side of the mesh pad 3 1, the uniformity of the gas velocities becomes high at a position spacing some distance from the perforated plate 33 to the downstream side, and this position changes depending on the gas velocity. Accordingly, it may be difficult to determine the position where the perforated plate 33 is provided. On the other hand, when the perforated plate 33 is provided at the backside of the mesh pad 31 in the neighborhood thereof, since the perforated plate 33 works to suppress the gas flow, the uniformity of the gas velocities becomes high at the mesh pad 31 provided just upstream of the perforated plate 33 so that the designing is easy. When the perforated plate 33 is provided at the backside of the mesh pad 31, it is preferable that a distance between the mesh pad 31 and the perforated plate 33 is no greater than 300 mm.

Further, since the separation between the gas and the droplets Is carried out in the pipe unit 2 (see FIG. 1), it is not necessary to provide the specially prepared large-diameter droplet separator between the pipes. Accordingly, since it is not necessary to specially prepare the knockout drum, the compressor suction drum or the like for droplet separation, the space for installation thereof and the peripheral equipments are also not required so that the reduction in size and cost of the whole facilities including construction cost can be achieved. Moreover, by providing, for example, a manhole near the droplet separation unit, the maintenance and check can be easily carried out. Further, in this embodiment, as will be shown in later-described examples, the gas velocity range at which the droplets having diameters no less than 8 $\mu$m can be removed by 100% can be desirably set by changing the gas passing area of the mesh pad 31.

Figure 4:
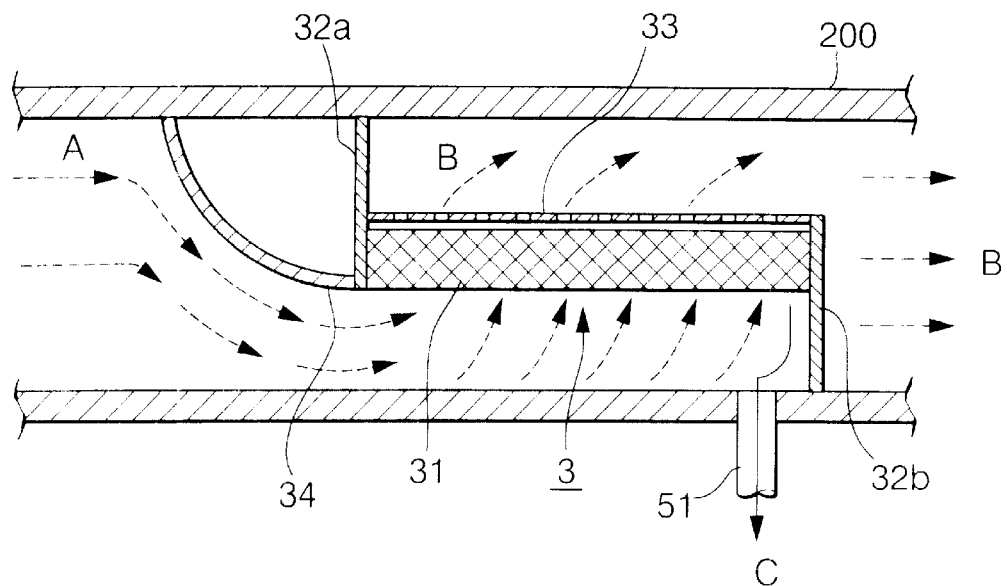
FIG. 4 is a longitudinal sectional view showing a modification of the first preferred embodiment of the present invention.

In the foregoing first preferred embodiment, it may be arranged, as shown in FIG. 4, that a guide member 34 is provided at the upstream side of the mesh pad 31. Specifically, the guide member 34 extends between the upper inner periphery of the pipe 200 and the upstream lower end of the mesh pad 31 while being convexed downward in a curved fashion. With this arrangement, since the gas containing droplets flows downward along the guide member 34 as shown by arrows A in FIG. 4, the gas-flow resistance is reduced. Accordingly, the gas containing droplets smoothly reaches the lower side of the mesh pad 31 so that the change in flow rate along the axis of the mesh pad 31 is reduced. Therefore, the velocity adjustment for equalizing the gas velocities along the axis of the mesh pad 31 can be achieved more easily.

Figure 5:
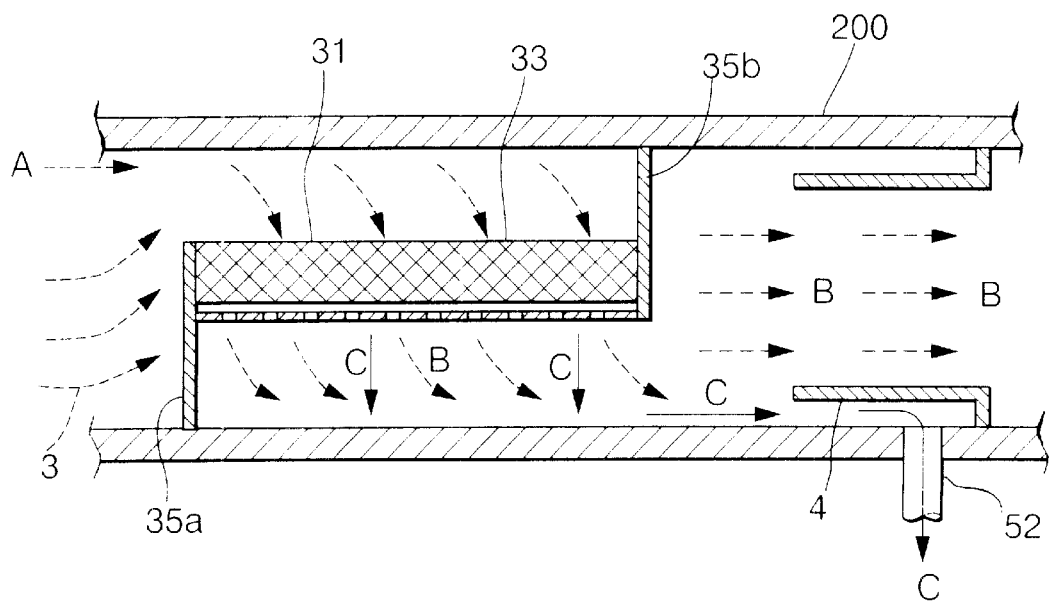
FIG. 5 is a longitudinal sectional view showing another modification of the first preferred embodiment of the present invention.

Further, as shown in FIG. 5, it may be arranged that at the upstream end of the mesh pad 31 Is provided a semicircular plate-like support 35a extending downward, and similarly, at the downstream end of the mesh pad 31 is provided a semicircular plate-like support 35b extending upward so that the gas containing droplets passes the mesh pad 31 from the upper side to the lower side thereof. Also in this modification, the perforated plate 33 is provided just downstream of the mesh pad 31, and the hole area rates thereof are gradually reduced toward the downstream side.

In this modification, the droplets can not pass the mesh pad 31 but adhere to the surfaces of the mesh pad 31. Then, the adhering droplets gradually collect to be the greater droplets and drop downward via the perforated plate 33 due to the gravity as shown by arrows C, and are collected by the liquid collecting unit 4 and discharged to the exterior of the pipe 200 via the discharge pipe 52. In this fashion, the droplets are separated from the gas flow. Accordingly, in this modification, it is not necessary to provide the discharge pipe 51 shown in FIG. 2A.

Figure 6A:
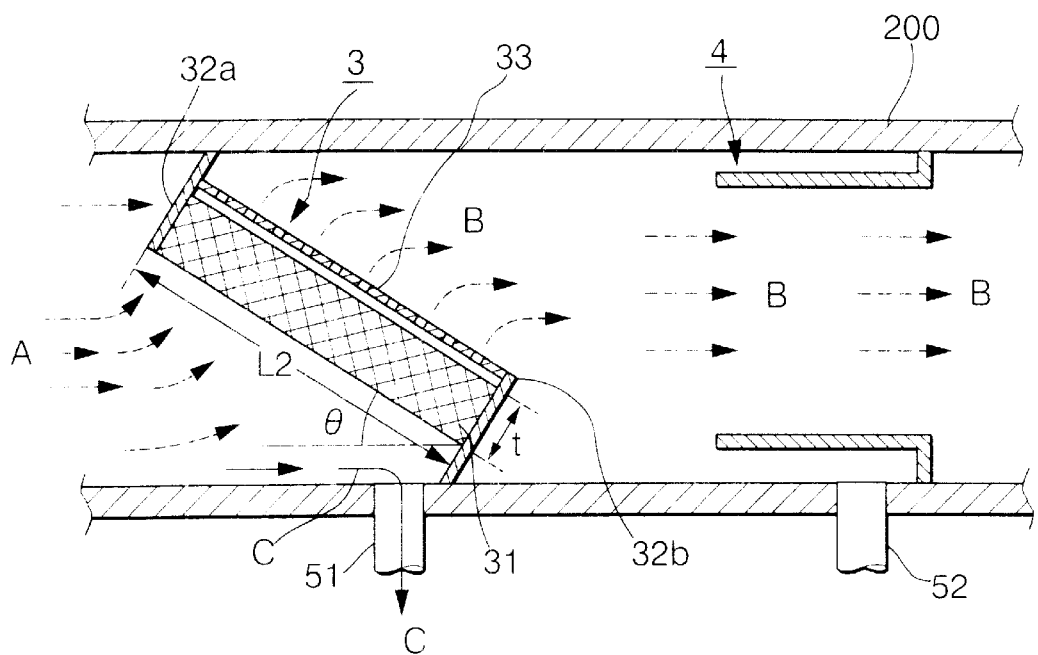
FIGS. 6A and 6B are a longitudinal sectional view and a cross-sectional view, respectively, showing another modification of the first preferred embodiment of the present invention.
Figure 6B:
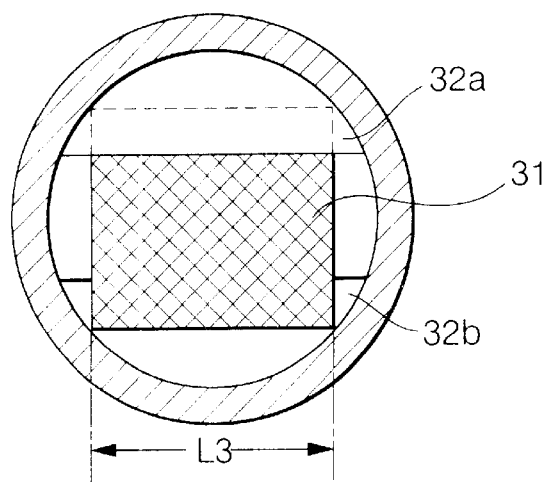

Further, as shown in FIG. 6, it may be arranged that the droplet separation unit 3 is provided in the pipe 200 in a slant posture. Specifically, the mesh pad 31 having an axial length L2 of 4040 mm, a width L3 being 0.7 times an inner diameter D of the pipe 200 and a thickness t of 100 to 150 mm may be inclined downward toward the downstream side at an inclination $\theta$=8.5° relative to the axis of the pipe 200. The sectional area (gas passing area) of the mesh pad 31 is set depending on the gas velocity in the pipe 200 and the sectional area of the pipe 200. Also in this modification, the perforated plate 33 is provided just downstream of the mesh pad 31, and the hole area rates are gradually reduced toward the downstream side.

In this modification, since the mesh pad 31 is inclined relative to the axis of the pipe 200, the gas passes the mesh pad 31 from the lower side to the upper side slantly relative to the axis of the pipe 200. Accordingly, the sectional area of the mesh pad 31 can be set greater than that of the pipe 200. Further, since the mesh pad 31 is inclined, the change in flow direction of the gas upon flowing to the lower side of the mesh pad 31 is small. Hence, since the change in flow rate along the axis of the mesh pad 31 is reduced, the velocity adjustment for equalizing the gas velocities along the axis of the mesh pad 31 can be achieved easily.

Figure 8:
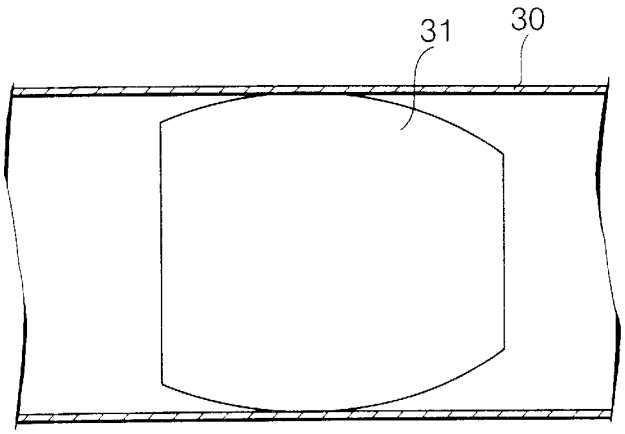
FIG. 8 is a plan view showing a mesh pad of a droplet separation unit employed in the modification shown in FIG. 7.

The pipe in which the droplet separation unit 3 and others are provided may have a diameter which is same as or different from diameters of other pipes, and it may have a larger diameter. FIG. 7 shows such a modification. In the figure, a portion of the pipe 200 is increased in diameter to form an increased-diameter portion 30. In the increased-diameter portion 30, a droplet separation unit 3 is provided inclining downward toward the downstream side. FIG. 8 is a plan view showing a mesh pad 31 as seen from above.

In this modification, a diameter of the increased-diameter portion 30 is set to 1200 mm, a diameter of the pipe 200 other than the increased-diameter portion 30 is set to 600 mm, a thickness t of the mesh pad 31 is set to 100 mm, a length L0 of the mesh pad 31 along the axis of the pipe 200 is set to 7000 mm, an inclination $\theta$ of the mesh pad 31 relative to the axis of the pipe 200 is set to 8.5° and a distance T between the perforated plate 33 and the mesh pad 31 along the diameter of the pipe 200 is set to 300 mm.

In this modification, as described above, the mesh pad 31 is provided in the increased-diameter portion 30. As compared with the case where the mesh pad 31 is provided in the pipe 200 at its portion other than the increased-diameter portion 30, assuming that a length of the mesh pad 31 is unchanged, the gas passing area of the mesh pad 31 can be increased. Accordingly, a sufficiently large applicable gas velocity range can be achieved with a smaller length of the mesh pad 31. For achieving the same applicable gas velocity range, as achieved by the structure of FIG. 7, at a portion other than the increased-diameter portion 30, the length L0 of the mesh pad 31 along the axis of the pipe 200 becomes as long as 20 m. Thus, the construction is much easier in the structure of FIG. 7.

Figure 9:
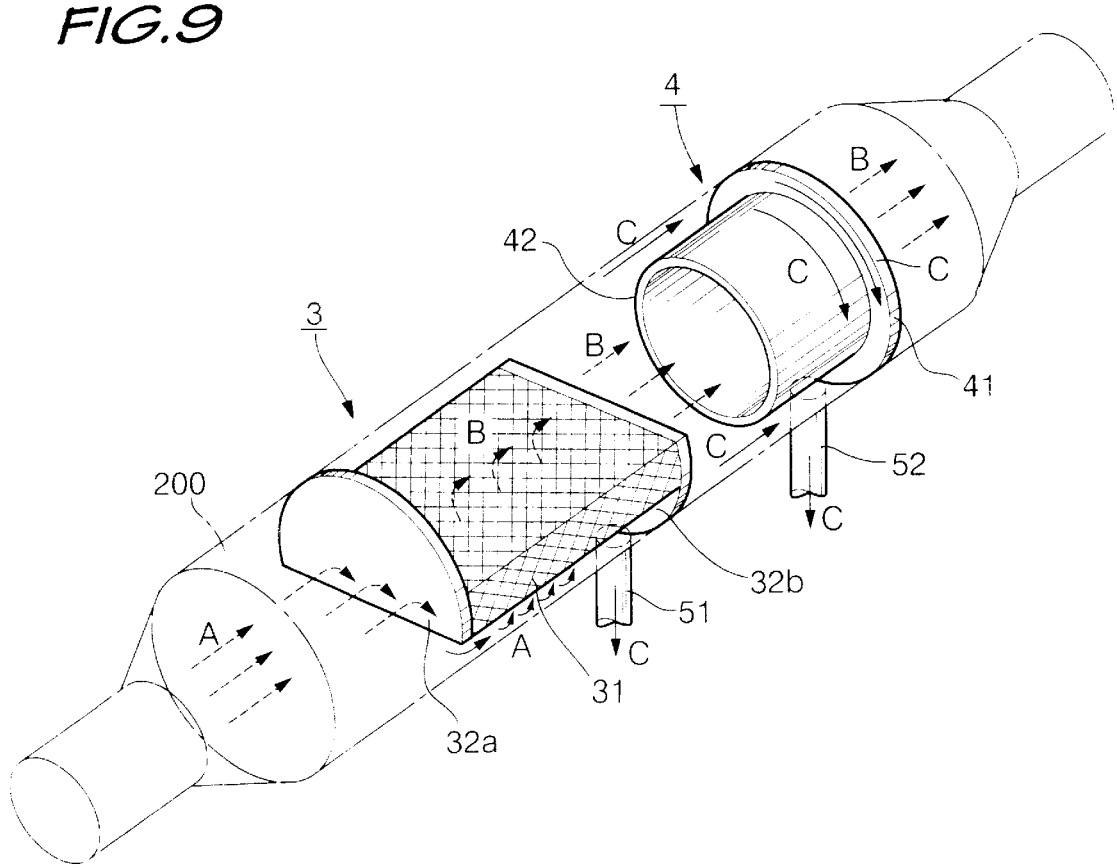
FIG. 9 is a perspective view showing another modification of the first preferred embodiment of the present invention.

Further, as shown in FIG. 9, It may be arranged that a droplet separation unit 3 is provided horizontally along the axis of the pipe 200 in the foregoing increased-diameter portion 30.

Further, a plurality of droplet separation units may be provided in the pipe 200. With this structure, even the gas velocity is initially high, since the gas velocity is reduced every time it passes one droplet separation unit, it may be arranged that the large droplets are removed by the first droplet separation unit and the smaller droplets are removed by the subsequent droplet separation units successively.

Figure 10A:
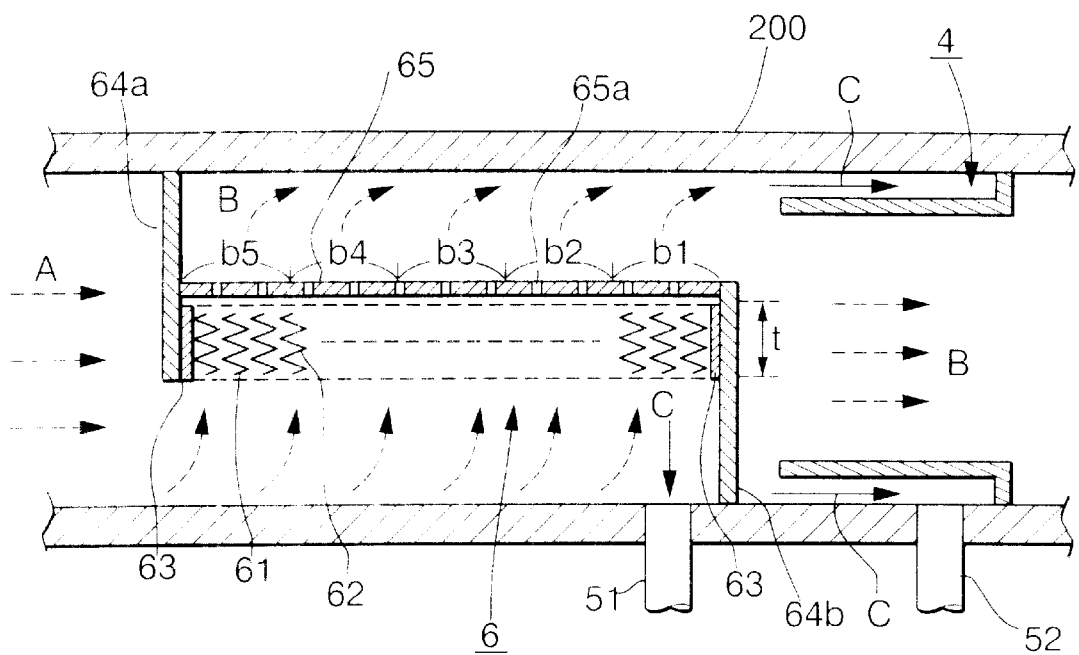
FIGS. 10A and 10B are a longitudinal sectional view and a cross-sectional view, respectively, showing a gas transfer pipe arrangement according to a second preferred embodiment of the present invention.
Figure 10B:
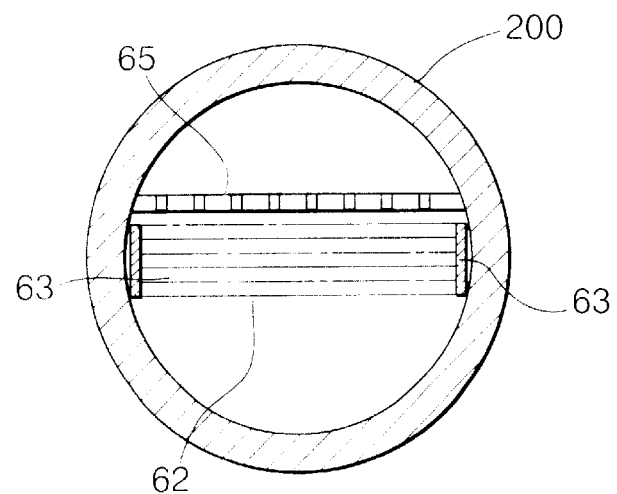

Now, the second preferred embodiment of the present invention will be described with reference to FIGS. 10A to 10B.

In the figures, a droplet separation unit 6 comprises a vane 61 working as an inertial-impingement separation element.

The vane 61 has the shape of a rectangular parallelepiped with a thickness t of 200 mm. The vane 61 is disposed horizontally in the pipe 200 at the essentially vertical center thereof so as to divide the inside of the pipe 200 into upper and lower parts.

The vane 61 comprises, for example, a number of corrugated impingement plates 62 each extending in a thickness direction of the vane 61 and arranged in parallel to each other at regular intervals along the axis of the pipe 200. Each impingement plate 62 is supported at its both sides by a support frame 63. At an upstream end of the vane 61 is provided a semicircular (as seen along an axis of the pipe 200) plate-like support 64a extending upward. Similarly, at a downstream end of the vane 61 is provided a semicircular plate-like support 64b extending downward. These supports 64a and 64b are welded to the inner periphery of the pipe 200 at upper and lower sides thereof, respectively.

Just at the backside (downstream side) of the vane 61, a perforated plate 65 formed with a number of holes 65a is provided so as to confront the whole upper surfaces of the vane 61 for working as a velocity adjusting member. The perforated plate 65 is divided into five regions b1 to b5 along the axis of the pipe 200, and the hole area rates thereof are set to be gradually smaller toward the downstream side, that is, in order of b5, b4, b3, b2 and b1. The other structure is the same as that of the first preferred embodiment.

In the pipe 200, the gas containing droplets passes the vane 61 and the perforated plate 65 from the lower side to the upper side thereof as shown by arrows A. Specifically, the direction of the gas flow upon passing the vane 61 is perpendicular to the axis of the pipe 200. The gas containing droplets flows zigzag between the adjacent Impingement plates 62. At this time, the gas component having small specific gravities passes between the adjacent impingement plates 62 and further flows downstream.

On the other hand, the inertial forces are applied to the droplets having large specific gravities so that the droplets deviate from the gas flow and collide against the impingement plates 62 to form liquid films so as to be separated from the gas flow. Then, the liquid films drop downward as shown by an arrow C due to the gravity, and are discharged to the exterior of the pipe 200 via the discharge pipe 51 just upstream of the support 64b and collected into the trap. On the other hand, the droplets having passed the vane 61 further advance due to the inertial force to collide against the inner periphery of the pipe 200, and then gradually collect to be the greater droplets which then flow downstream along the inner periphery of the pipe 200 as shown by arrows C. Subsequently, the droplets are collected by the liquid collecting unit 4 and then discharged to the exterior of the pipe 200 via the discharge pipe 52.

Also in this embodiment, since the vane 61 is arranged in the pipe 200 horizontally along the axis thereof, the gas passing area of the vane 61 can be set greater than the sectional area of the pipe 200. Thus, even if the gas velocity in the pipe 200 is high, that is, 6 m/sec, the droplets can be separated from the gas using the vane 61. As in the first preferred embodiment, the gas velocities can be adjusted by the perforated plate 65 to be essentially uniform over the whole gas passing regions of the vane 61 so that the droplet separation can be reliably achieved.

It is preferable that the present invention is applied to a gas transfer pipe which transfers gas composed of, as a main component, hydrocarbon with carbon atoms 1 to 8 and containing droplets composed of, as a main component, hydrocarbon with carbon atoms 4 to 8.

In the foregoing preferred embodiments, the perforated plates 33 and 65 may be provided at the front side (upstream side) of the mesh pad 31 and the vane 61, respectively. Further, it may be arranged that the mesh pad 31 or the vane 61 has different thicknesses along the axis of the pipe 200 so as to adjust flow resistances thereof to equalize the passing velocities of the gas.

Further, in each of the foregoing preferred embodiments, it is preferable that the droplet separation unit is made of a light material having corrosion and heat resistance. As long as having such properties, various materials, such as steel and rigid, may be used for the droplet separation units depending on use. Moreover, a plurality of the droplet separation units may be used in combination depending on use. In this case, the droplet separation units of different types may be combined. This can further increase the applicable range of the gas velocity. Moreover, the droplet separation unit may be permanently or detachably fixed to the inner periphery of the gas transfer pipe. In practice, after the droplet separation unit is disposed in a certain pipe, this pipe is coupled to other pipes through welding or the like.

EXAMPLES

Now, the results of the experiments will be described hereinbelow.

Example 1

Figure 11A:
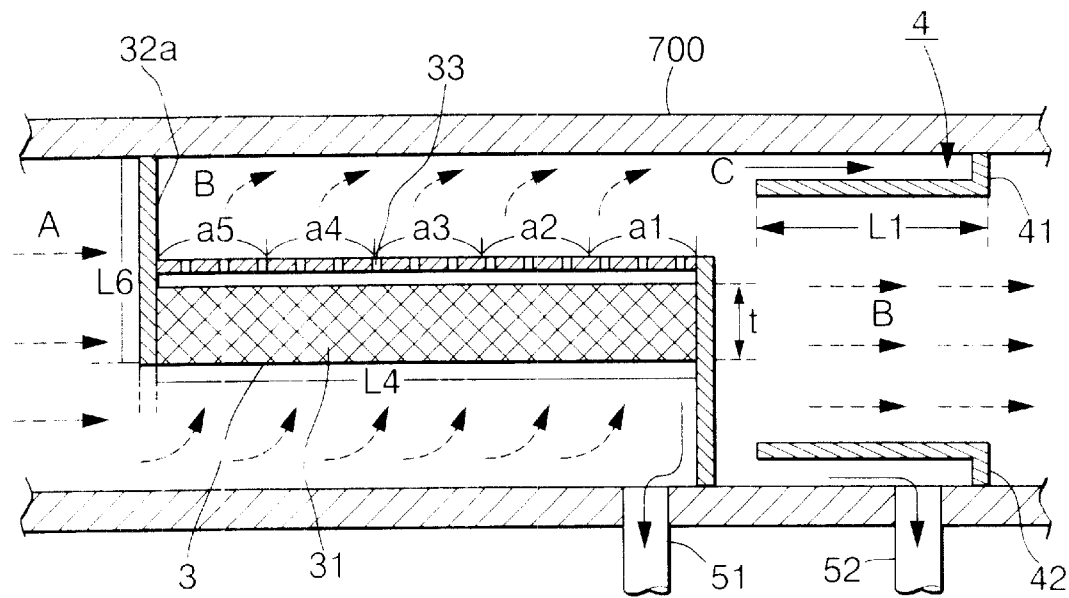
FIGS. 11A and 11B are a longitudinal sectional view and a cross-sectional view, respectively, showing a gas transfer pipe arrangement used in an example.
Figure 11B:
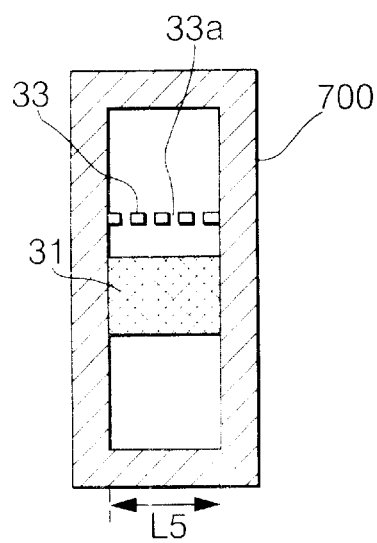

As shown in FIGS. 11A and 11B, a vinyl chloride pipe 700 of a two-dimensional model having a rectangular cross-section was provided, wherein a width of the pipe 700 was set to 100 mm, a height thereof was set to 700 mm and a length thereof was set to 3.5 m. Then, a droplet separation unit 3 having a mesh pad 31 was disposed in the pipe 700 (horizontal mesh type). The dimensions of the mesh pad 31 were such that the diameter of wire was set to 0.120 mm, an axial length L4 was set to 2000 mm, a width L5 was set to 100 mm, a thickness t was set to 100 mm, the surface area was set to 310 $m^2/m^3$, and the porosity was set to 98%. A length L6 of a support 32a was set to 550 mm. A length L1 of a tubular portion 42 of a liquid collecting unit 4 was set to 200 mm and a distance between the tubular portion 42 and the inner periphery of the pipe 700 was set to 10 to 20 mm. The hole area rates of a perforated plate 33 were such that a1=8.6%, a2=10.0%, a3=11.4%, a4=12.8% and a5=14.3%.

Gas (air) containing droplets (water) having mean diameters of 10 to 20 $\mu$m and diameter distribution of 2.4 to 165 $\mu$m was produced by a spray nozzle and supplied to the pipe while changing the velocity. Gas velocities in the pipe at which the droplets having diameters of no less than 8 $\mu$m could be captured by 100%, the gas flow energies, and a pressure drop at the gas velocity of 7 m/sec in the pipe were derived.

Experiments were similarly carried out in those cases, respectively, where a mesh pad (droplet separation unit) was disposed in the pipe 700 slantly (slant mesh type), and where a droplet separation unit having a vane (vane type) was used.

The dimensions of the mesh pad (slant mesh type) were such that a length along the axis of the pipe was set to 2020 mm, a width was set to 100 mm and an inclination was set to 8.5°. The other conditions were the same as those in the foregoing horizontal mesh type.

On the other hand, the dimensions of the vane (vane type) were such that a length along the axis of the pipe was set to 1000 mm, a width was set to 100 mm, a thickness was set to 200 mm, a thickness of each impingement plate 0.6 mm, and an interval between the adjacent Impingement plates was set to 22 mm. A length of a support (vane type) was set to 150 mm. A length of a tubular portion of a liquid collecting unit (vane type) was set to 200 mm, and a distance between the tubular portion and the inner periphery of the pipe was set to 10 to 20 mm. The hole area rates of a perforated plate (vane type) were such that b1=8.6%, b2=10.0%, b3=11.4%, b4=12.8% and b5=14.3%.

Figure 13:
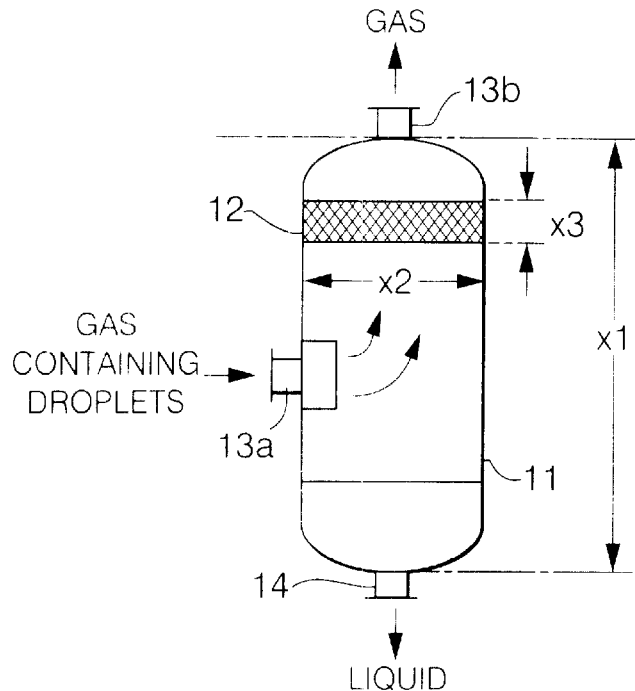
FIG. 13 is a diagram showing a conventional droplet separator.
Figure 14:
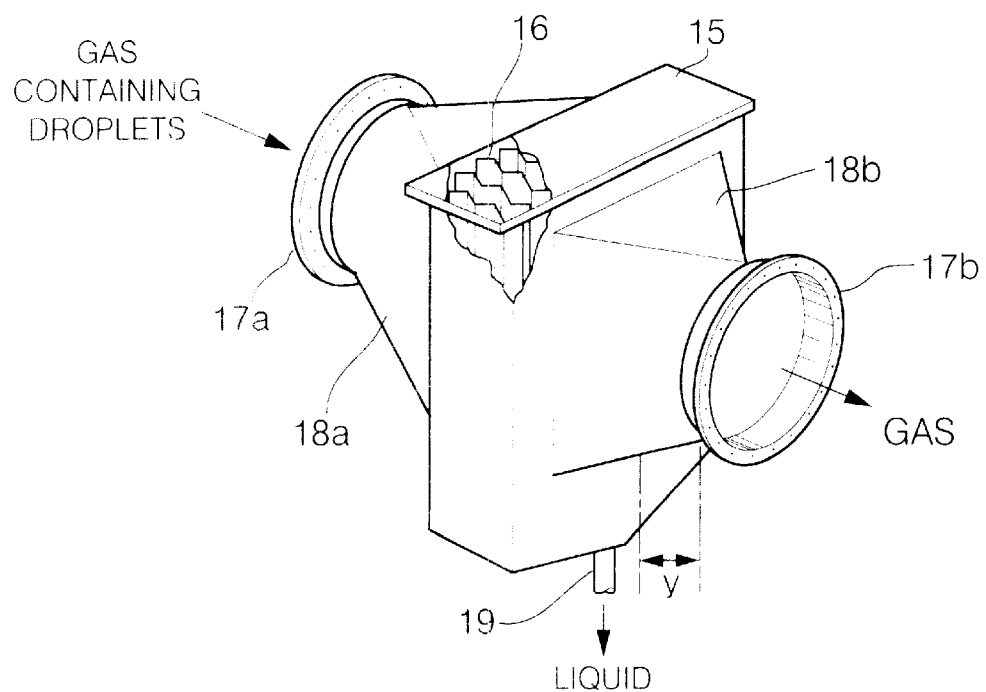
FIG. 14 is a perspective view showing another conventional droplet separator.

As comparative examples, experiments were similarly carried out in those cases, respectively, where a conventional droplet separator having a mesh pad (see FIG. 13) was used, and where a conventional droplet separator having vanes (see FIG. 14) was used.

The dimensions of the conventional mesh-type droplet separator (FIG. 13) were such that a length x1 of the separator vessel 11 was set to 3000 mm, an inner diameter x2 was set to 800 mm, and a thickness x3 of the mesh pad 12 was set to 150 mm. The dimensions of the conventional vane-type droplet separator (FIG. 14) were such that the size of the separator vessel 15 was set to 1000 mm×1000 mm×400 mm and a height y of each of the flow passage members 18a and 18b was set to 500 mm.

The results of the experiments are shown in Table 1.

TABLE 1

|  | Gas Vel In Pipe [m/sec] | Gas Flow Energy [kg/m · sec$^2$] | Pressure Drop At 7 m/sec [mmH$_2$O] |
| --- | --- | --- | --- |
| Present Invention |  |  |  |
| Horizontal Mesh Type | 0.6 to 28 | 0.4 to 970 | 55 |
| Slant Mesh Type | 1 to 28 | 1.2 to 960 | 60 |
| Vane Type | 1 to 28 | 1.2 to 970 | 50 |
| Prior Art |  |  |  |
| Mesh-Type Separator | 0.3 to 3 | 0.1 to 10 | 10 |
| Vane-Type Separator | 1 to 10 | 1 to 120 | 50 |

From Table 1, it was confirmed that, when the droplet separation units of the present invention were disposed in the pipes, the applicable ranges of the gas velocity at which the droplets having diameters no less than 8 μm could be captured by 100% were significantly greater (1 to 28 m/sec) as compared with the conventional droplet separators. Following this, It was also confirmed that, when the droplet separation units of the present invention were disposed in the pipes, the applicable ranges of the gas flow energies, particularly the upper limits thereof were significantly greater as compared with the conventional droplet separators. Specifically, when the droplet separation units of the present invention were disposed in the pipes, the upper limits were 960 to 970 kg/m·sec$^2$, while, when the conventional droplet separators were used, the upper limits were 10 to 120 kg/m·sec$^2$.

Example 2

Simulations were carried out by a computer in those cases, respectively, where a droplet separation unit having a mesh pad was arranged slantly relative to an axis of a pipe having no increased-diameter portion, and where a droplet separation unit having a mesh pad was arranged slantly relative to an axis of a pipe having an increased-diameter portion. Gas velocities in the pipe at which the droplets having diameters of no less than 8 μm could be captured by 100%, the gas flow energies, and a pressure drop at the gas velocity of 7 m/sec in the pipe were derived for each of the former and latter cases.

Figure 12A:
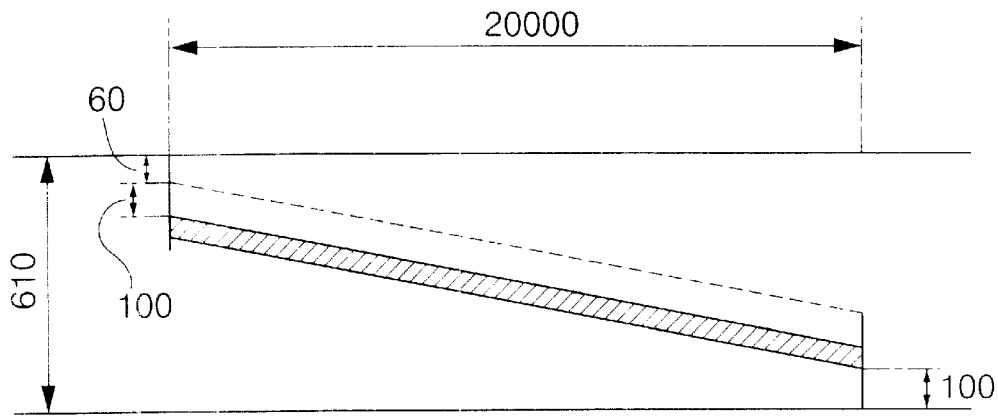
FIGS. 12A and 12B are diagrams for explaining conditions of simulations carried out in another example.

In the former case (with no increased-diameter portion), a mesh pad similar to that used in Example 1 was disposed in a pipe having a diameter of 610 mm according to the dimensions shown in FIG. 12A. In the figure, a hatched portion represents the mesh pad, while a dotted portion represents a perforated plate. The mesh pad was inclined at 0.70 relative to an axis of the pipe. The perforated plate was divided into five regions along the axis of the pipe, and the hole area rates of those regions were set to 8.6%, 10.0%, 11.4%, 12.8% and 14.3% from the downstream side, respectively.

Figure 12B:
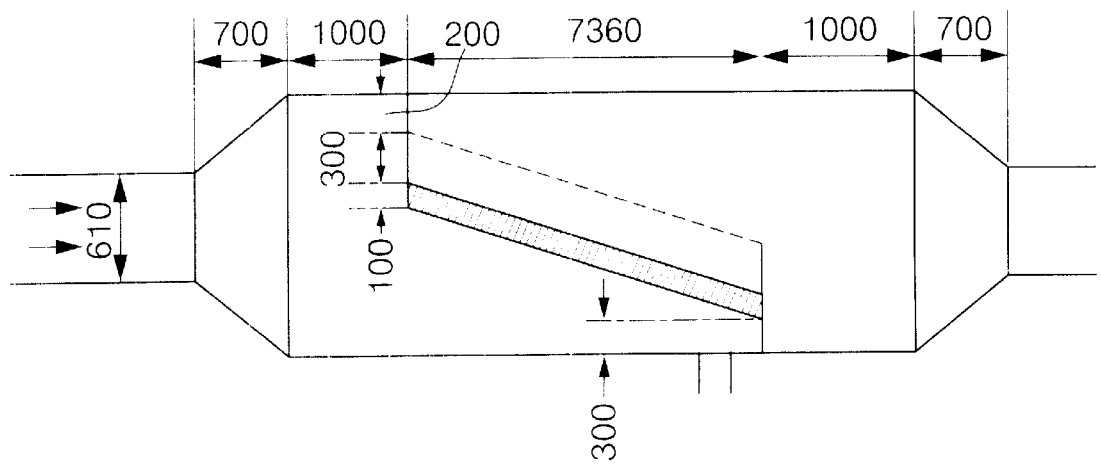

In the latter case (with an increased-diameter portion), a pipe having a diameter of 610 mm was formed with an increased-diameter portion having a diameter of 2000 mm, and a mesh pad similar to that used in Example 1 was disposed in the increased-diameter portion according to the dimensions shown in FIG. 12B. In the figure, a hatched portion represents the mesh pad, while a dotted portion represents a perforated plate. The mesh pad was inclined at 8.50 relative to an axis of the pipe. The perforated plate was divided into five regions along the axis of the pipe, and the hole area rates of those regions were set to 0.5%, 10.0%, 11.4%, 12.8% and 14.3% from the downstream side, respectively.

The results of the simulations are shown in Table 2.

TABLE 2

|  | Gas Vel In Pipe [m/sec] | Gas Flow Energy [kg/m · sec$^2$] | Pressure Drop At 7 m/sec [mmH$_2$O] |
| --- | --- | --- | --- |
| Present Invention |  |  |  |
| Slant Mesh Type | 1 to 54 | 1.2 to 3500 | 50 |
| Increased-Diameter Pipe Slant Mesh Type | 1 to 54 | 1.2 to 3500 | 50 |

From Table 2, it was found that the applicable gas velocity ranges of the mesh pads were large even in the results of the simulations and that the upper limits of the gas velocity in the pipes were greater than those achieved in the model-based experiments in Example 1. It was also noted that, in case of the pipe having the increased-diameter portion, the length of the mesh pad along the aids of the pipe could be reduced as compared with the pipe having no such an increased-diameter portion. On the other hand, in Table 2, the upper limit of the applicable gas velocity range exceeds 50 m/sec.

Since this value approximates the upper limit in the actual gas transfer pipe, it can be said that substantially no gas velocity upper limit exists.

Accordingly, in the present invention, it has been confirmed that, even if the gas velocity in the pipe is high, the separation between the droplets and the gas can be reliably achieved. It has been further confirmed that, since the allowable range of the gas flow energy is great as noted above, even if the throughput changes depending on change in quantity of demand in the plant so that the gas flow energy in the pipe changes correspondingly, it can be fully dealt with.

While the present invention has been described in terms of the preferred embodiments, the invention is not to be limited thereto, but can be embodied in various ways without departing from the principle of the invention as defined in the appended claims.

What is claimed is:

1. A gas transfer pipe arrangement comprising:
   a pipe in which gas containing droplets of diameters no less than 8 μm flows at a velocity no less than 6/m/sec;

a droplet separating mechanism provided in said pipe for separating the droplets from the gas;

a liquid collecting mechanism provided in said pipe at a position downstream of said droplet separating mechanism for collecting a liquid from the droplets separated by said droplet separating mechanism; and a liquid discharging mechanism for discharging the liquid collected by said liquid collecting mechanism to the exterior of said pipe, wherein said droplet separating mechanism comprises a plate-like inertial-impingement separation element for separating the droplets from the gas due to a difference in inertial force between the droplets and the gas, said inertial-impingement separation element is disposed slantly relative to an axis of said pipe so that a velocity of the gas passing said inertial-impingement separation element becomes no greater than a maximum value of an applicable gas velocity range of said inertial-impingement separation element, said droplet separating mechanism further comprises a velocity adjusting member provided at at least one of a front side and a backside of said inertial-impingement separation element, and said velocity adjusting member has hole area rates which are set smaller at a region thereof corresponding to a region at said front side where a velocity of the gas is higher.

2. The gas transfer pipe arrangement according to claim 1, wherein said pipe is coupled to adjacent pipes through welding.

3. The gas transfer pipe arrangement according to claim 1, wherein a first portion of said pipe is greater in diameter than other portions thereof, and said intertial-impingement separation element is provided in said first portion.

4. The gas transfer pipe arrangement according to claim 1, wherein said velocity adjusting member comprises a perforated plate.

5. The gas transfer pipe arrangement according to claim 1, further comprising a guide member provided at an upstream side of said intertial-impingement separation element in an axial direction of said pipe for guiding the flow of the gas containing the droplets.

* * * * *